United States Patent [19]

Espinoza et al.

[11] Patent Number: 4,603,877
[45] Date of Patent: Aug. 5, 1986

[54] CONTROL MEANS FOR OCCUPANT RESTRAINT BELT SYSTEM

[75] Inventors: John A. Espinoza, Redford; Jeffrey L. Konchan, Warren; Ronald P. Rimbey, Utica, all of Mich.

[73] Assignee: General Motors Corporation, Detroit, Mich.

[21] Appl. No.: 723,438

[22] Filed: Apr. 15, 1985

[51] Int. Cl.⁴ .............................................. B60R 22/34
[52] U.S. Cl. .................................... 280/807; 280/803; 180/268
[58] Field of Search ................ 180/268, 286; 280/807, 280/803, 806

[56] References Cited

U.S. PATENT DOCUMENTS 3,692,328 9/1972 Arlauskas ............................ 280/803
3,727,943 4/1973 Augunas .............................. 280/803
4,007,948 2/1977 Stephenson ......................... 280/807

Primary Examiner—John J. Love
Assistant Examiner—Karin L. Ferriter
Attorney, Agent, or Firm—Herbert Furman

[57] ABSTRACT

A control means for an occupant restraint belt system includes a cable connected to a disablement mechanism of a restraint belt retractor at one end and connected at the other end to an actuating lever. The actuating lever is moved to an actuating position upon operation of the latch mechanism by either the inside or the outside operator. A latch bolt position sensor moves in the path of the latch bolt and mounts a blocking lever. When the sensor is moved to an actuating position by the latch bolt as the bolt moves from a fully latched position through a partially latched position, the locking lever moves to a blocking position with respect to the cable actuating lever so that the restraint belt retractor remains disabled when the door is in an open position and the inside and outside operators are released.

5 Claims, 5 Drawing Figures

CONTROL MEANS FOR OCCUPANT RESTRAINT BELT SYSTEM

This invention relates generally to a control means for an occupant restraint belt system and more particularly to a control means for disabling door mounted retractors of an occupant restraint belt system upon opening movement of the door to enable freedom of occupant egress and ingress.

Control means for disabling door mounted retractors of an occupant restraint belt system retractors are well known in the prior art. U.S. Pat. No. 3,727,943 Augunas et al Occupant Restraint System discloses control means for temporarily disabling a door mounted retractor when either the inside or outside operator or door handle is actuated and for maintaining the disablement when the door is in at least a partially open position. The door latch shown in Augunas is of the uncoupling type. Disablement is obtained through actuation of the inside and outside handles regardless whether the handles are coupled to or uncoupled from the detent of the latch bolt. Disablement occurs as soon as the latch bolt is unlatched from the striker and is maintained, even though the inside or outside handle is released, through a sensing arrangement which senses the position of the latch bolt.

Another control means is disclosed in U.S. Pat. No. 3,692,328 Arlauskas et al, Control Means for Occupant Restraint Belt Retractor. In Arlauskas, disablement of the retractor is maintained when the bolt is unlatched through a sensing arrangement which senses the position of the striker rather than by sensing the position of the latch bolt.

The control means of this invention includes a cable means for actuating the disabling means of a door mounted restraint belt retractor. The cable means is controlled by a cable actuating lever which is operatively coupled to the operating lever of the door latch whenever the operating lever is actuated by either the inside or outside operator. A blocking lever is carried by a latch bolt position sensing lever and is biased toward blocking position with respect to the cable operating lever. The latch bolt position sensing lever holds the blocking lever in unblocking position when the bolt is in a latched position. The latch bolt position sensing lever permits the blocking lever to move to blocking position to maintain disablement of the retractor as the bolt moves from a latched position to an unlatched position.

Disablement of the retractor temporarily occurs whenever the inside or the outside handle is actuated. The temporary disablement is maintained only when the latch bolt is in an unlatched position. Thus, disablement of the retractor is not maintained unless the door latch is in an unlatched position.

One feature of this invention is that it provides an improved control means for an occupant restraint belt system which includes a latch bolt position sensing means controlling disablement of a door mounted retractor when the latch bolt of the door latch is in an unlatched position. Another feature is that the control means includes an actuating lever and a blocking lever which is carried by a latch bolt position sensing lever and is moved into a blocking position with respect to the actuating lever when the latch bolt position sensing lever senses that the latch bolt of the door latch is in an unlatched position. A further feature is that the latch bolt position sensing lever moves in a plane transversely of the plane of movement of the latch bolt and is located in an inoperative position when the latch bolt is in a latched position. Yet another feature is that the latch bolt position sensing lever is resiliently biased to an inoperative position in engagement with stop means when the latch bolt is in a latched position. Yet a further feature is that the blocking lever is resiliently biased into engagement with the latch bolt position sensing lever and can move to a blocking position with respect to the actuating lever only when the latch bolt position sensing lever is in operative position. Still another feature is that the latch bolt position sensing lever is moved from an inoperative position to operative position by the latch bolt as the latch bolt moves from latched position to unlatched position.

These and other features will be readily apparent from the following specification and drawings wherein.

Figure 1:
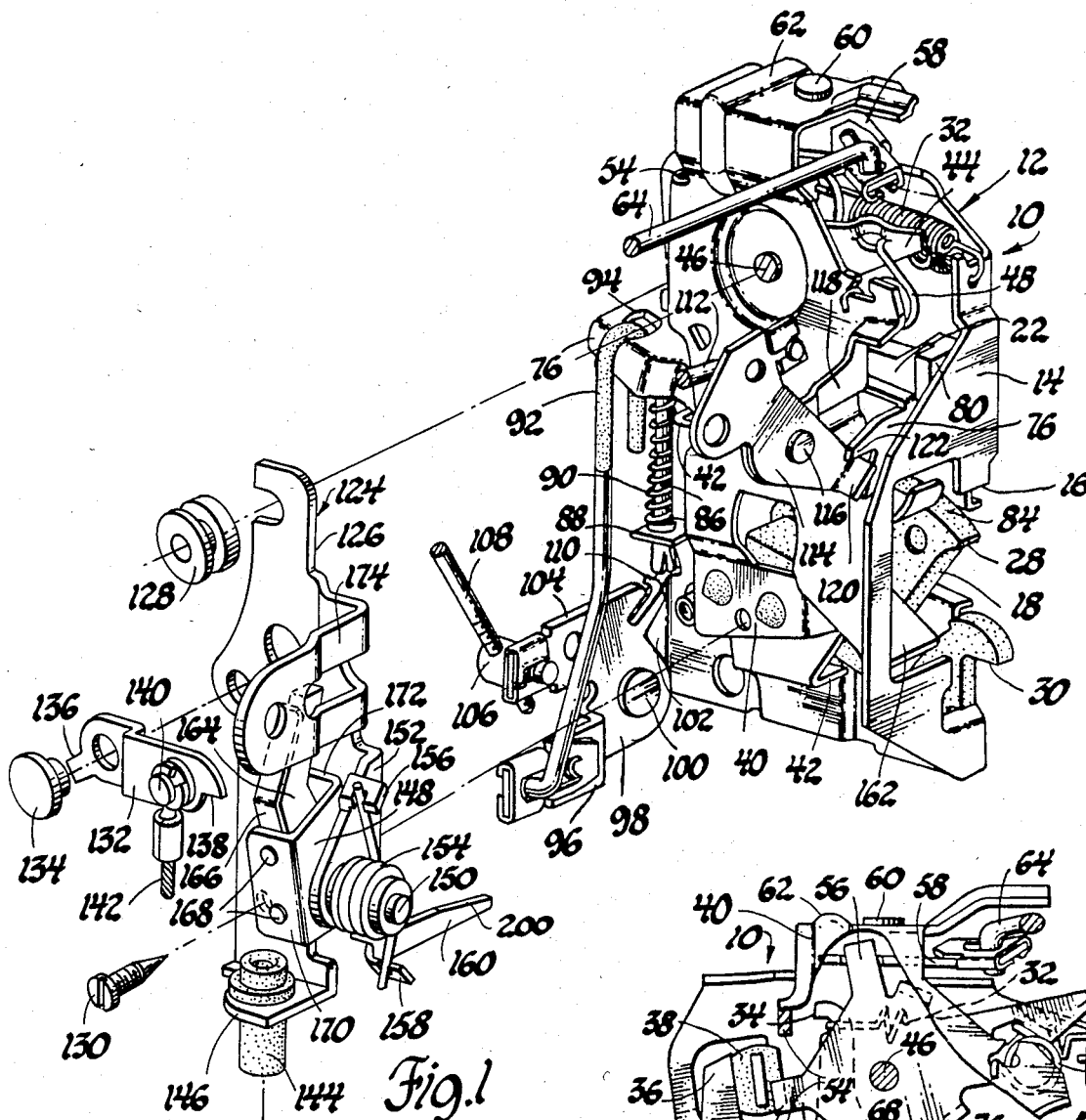
FIG. 1 is an exploded perspective view of a vehicle door latch and control means according to this invention.

The vehicle closure latch 10 shown in FIGS. 1 through 5 of the drawings is substantially the same as a latch which has been widely used in present and previous production vehicles manufactured by the Assignee of this invention. In view of the widespread use of the latch, the details thereof are well known and therefore only a brief description of the operating components will be given.

The latch 10 includes a frame 12 having an integral side wall or flange 14, with the frame and side wall being apertured at 16 to provide for entrance and exit of a headed striker pin, not shown. The striker pin is mounted on the vehicle body lock pillar. A plastic coated fork type bolt 18 is pivoted at 20 to the frame 12. The bolt is shown in the released or unlatched position in FIGS. 1 through 4 and the latched position in FIG. 5. A detent 22 is pivoted at 24, FIG. 2, to the frame 12 and includes a foot or shoulder 26 which is engageable with either a shoulder 28 or a shoulder 30 of the bolt 18 to hold the bolt respectively in either intermediate latched or fully latched position. A tension spring 32 is hooked between a leg 34 of the detent and the flange 14 of the frame to continually bias the detent 22 clockwise as viewed in FIGS. 2 and 3 towards engaged position with the bolt 18. The detent 22 is located against the bias of spring 32 by the engagement of a leg 36 thereof with a rubber bumper 38 secured to a lanced lateral tab of frame 12.

A back plate 40 is spaced from the frame 12 and includes lateral tabs 42 which are staked to the frame 12 to secure the back plate thereto. A locking lever 44 is pivoted to a pin 46 extending between frame 12 and the back plate 40. An overcenter spring 48 is hooked between the locking lever 44 and the back plate 40 to selectively and alternately bias the locking lever to unlocked position, as shown, or to a locked position clockwise of this position. The locking lever 44 is alternately located in each position by respective engagement of a leg 50 thereof with the lower and upper edges of a U-shaped slot provided in a lateral tab 54 of the back plate 40. Another leg 56 of the locking lever extends upwardly and is trapped in a slot of an auxiliary lever 58 which is pivoted at 60 to a rib reinforced flange 62 of the back plate. The lever 58 is connected by a rod 64 to a conventional outside key cylinder to move the locking lever between locked and unlocked positions.

Figure 2:
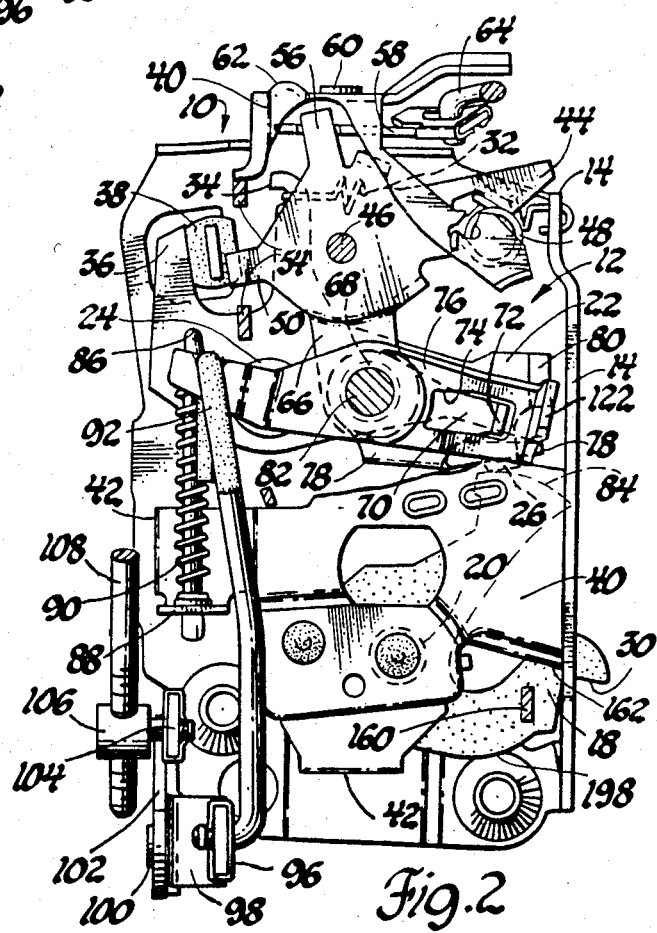
FIG. 2 is a partially broken away view of the door latch of FIG. 1.

An offset leg 66 of the locking lever 44 is pivoted at 68, FIG. 2 to one leg of a U-shaped intermittent member 70. This leg includes a lateral tab 72 which extends through an arcuate slot 74 of an operating lever 76 for a purpose to be described. The other leg 78 of the intermittent member extends toward flange 14 and is movable into and out of abutting relationship to the lower edge of a lateral tab 80 of the detent 22. The operating lever 76 is pivoted at 82 to the back plate 40. The pivot 82 is coaxial with the pivot 68 when the locking lever is in unlocked position.

When the locking lever is in its unlocked position, as shown, the leg 78 of the intermittent member 70 is in abutting relationship to the lower edge of the tab 80 of the detent 22, FIG. 2. The intermittent member rotates the detent counterclockwise about its pivot 24 when the intermittent member is rotated counterclockwise about its pivot 68 by the operating lever 76. Should the bolt 18 be in an intermediate latched position or a fully latched position, FIG. 5, with the foot 26 of the detent in engagement with either shoulder 28 or 30 of the bolt, respectively, counterclockwise rotation of the detent will release the detent foot from the engaged bolt shoulder to permit the door to be opened as the striker pin rotates the bolt to its unlatched position, as shown in FIGS. 1 to 4. The foot 26 of the detent 22 rests on the edge 84 of the leading leg of bolt 18. When the door is closed, the engagement of the striker pin with this leading leg rotates the bolt to intermediate or fully latched positions wherein the striker pin is trapped in the bolt throat and the detent foot 26 engages either shoulder 28 or shoulder 30, respectively.

Should the locking lever be in its locked position, clockwise of its position shown, the leg 78 of the intermittent member will move to the left, as viewed in FIG. 2, and out of abutting relationship to the lower edge of the tab 80 so that rotation of the operating lever 76 will not have any effect on the detent 22.

Figure 3:
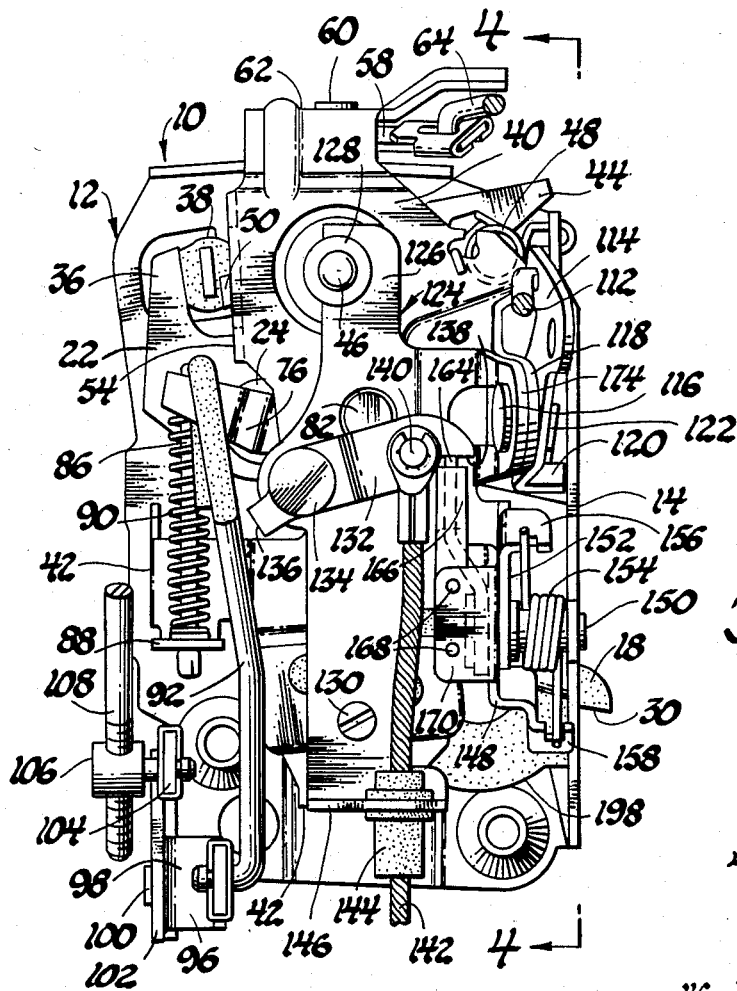
FIG. 3 is a view of the door latch and control means of FIG. 1 in assembled position.

As shown in FIGS. 1, 2 and 3, the lefthand end of the operating lever 76 includes an opening which slidably receives the upper end of a pin 86, the lower shouldered end of which is staked to a tab 88 of back plate 40. A coil spring 90 surrounds the pin 86 and seats between the shouldered end of the pin and the lower surface of lever 76 to continually bias the lever 76 clockwise about its pivot 82.

The hooked upper end of a transfer rod 92 is received in a slot 94 of lever 76, FIG. 1. The lower end of the rod 92 is bent laterally and secured by a conventional spring clip to one offset leg 96 of a bell crank transfer lever 98. The lever 98 is pivoted at 100 to an integral lateral ear or arm 102 of the frame 12. The other leg 104 of the transfer lever 98 rotatably mounts a stud 106 which threadedly receives the lower threaded end of a rod 108. The rod 108 extends upwardly and is connected to a conventional outside door handle, not shown, which is mounted on the outer panel of a vehicle body door.

As best shown in FIG. 1, the lever 98 includes an integral narrow bendable tab 110 having a terminal lateral flange which is engageable with an edge of the ear 102 to locate the lever 98 in a counterclockwise direction relative to the ear.

When the lever 98 is rotated counterclockwise, FIG. 1, by the outside handle through downward shifting of the rod 108, the rod 92 shifts vertically and rotates lever 76 counterclockwise about pivot 82.

An inside remote handle, not shown, is connected by a rod 112, FIG. 1, with an inside release lever 114 which is pivoted at 116 to an offset lateral flange or ear 118 of back plate 40. The lever 114 includes a lateral tab 120 which underlies a lateral tab 122 of the operating lever 76 so that rotation of the lever 114 in a counterclockwise direction as viewed in FIG. 1 operates to rotate the lever 76 counterclockwise about its pivot 82.

It will be noted that rotation of the lever 76 by the rod 92 occurs without rotation of the lever 114 and likewise rotation of the lever 76 by the lever 114 occurs without any movement of the rod 92.

The foregoing is a brief description of the manner in which the basic structure of the lock operates. A more complete description can be found in Ser. No. 673,673, Adams et al, Vehicle Closure Latch, filed Nov. 21, 1984 assigned to the assignee of this invention.

Referring now to FIGS. 1 and 3 through 5 of the drawings, the control means 124 of this invention is a self-contained module which can be added to the door latch 10 without modification of the operating components thereof.

The control means includes a bracket 126 which overlies the back plate 40 and has a hooked upper end which engages the pin 46 and is held in place by a bushing 128 which clamps the upper end against the back plate when the pin 46 is headed over. The lower end of the bracket 126 is secured to the back plate 40 by a self-tapping screw 130. An offset actuating lever 132 is pivoted at 134 to the bracket 126. A lateral leg 136 of the actuating lever underlies the lefthand end portion of the operating lever 76. The righthand end portion of the actuating lever has a shoulder 138 and is pivoted at 140 to one end of a flexible push-pull cable 142. The cable is guided in its movement by a bushing 144 which is fitted within a slotted flange 146 at the lower end of the bracket 126.

Figure 5:
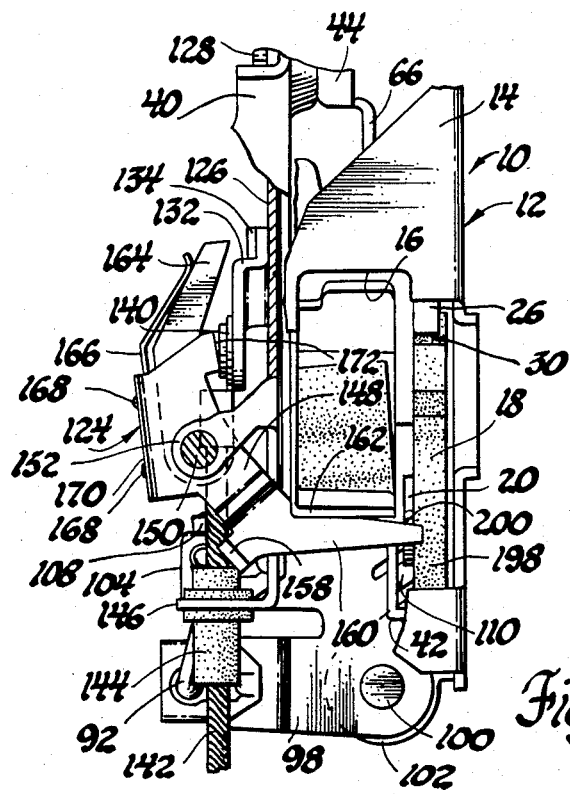
FIG. 5 is a view of a portion of FIG. 4 with the latch bolt in latched position.
Figure 4:
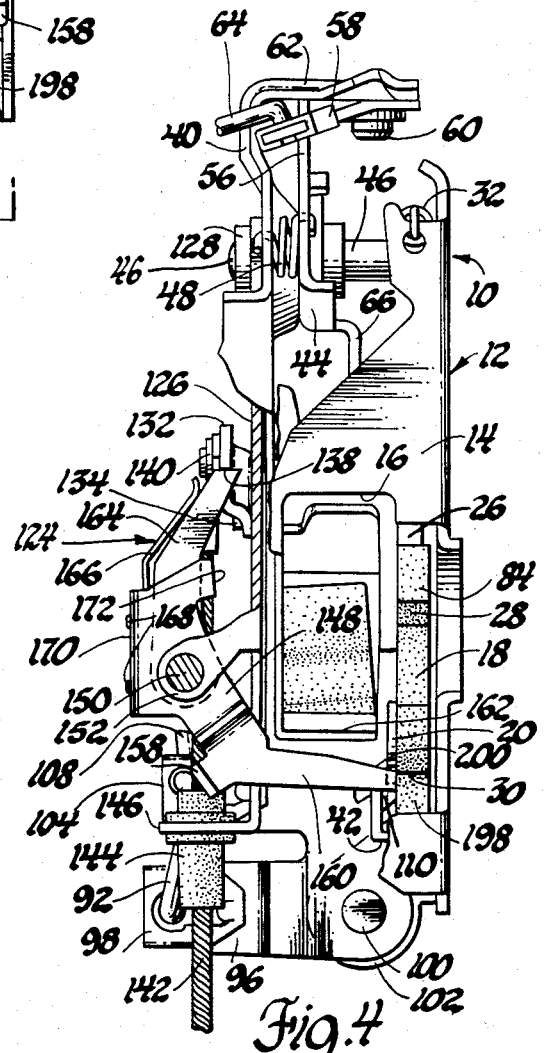
FIG. 4 is a view taken along line 4—4 of FIG. 3.

A latch bolt position sensing lever 148 is pivoted at 150 to a lateral flange 152 of the bracket 126. A coil torsion spring 154 surrounds the pivot 150 and has one leg thereof engaging a notched tab 156 of flange 152 and the other leg thereof engaging a notched offset lateral tab 158 of the lever 148 to continually bias the lever 148 counterclockwise as viewed in FIGS. 1, 4 and 5. It will be noted from FIGS. 4 and 5 that the lever 148 swings in a plane transverse of the plane of movement of the bolt 18. When the bolt is in latched position as shown in FIG. 5, a leg 160 of the lever 148 engages a guide 162 of back plate 40 to locate lever 148 in an unactuated position wherein leg 160 lies in the path of movement of the bolt 18. When the bolt is in unlatched position as shown in FIG. 4, the leg 160 engages the face of the bolt 18 to pivot the lever 148 slightly clockwise and locate the lever in actuated position. Spring 154 continually biases lever 148 toward unactuated position.

A blocking lever 164 is coaxially pivoted at 150 with the lever 148 on flange 152. A leaf spring 166 which is riveted at 168 to a flange 170 of the lever 148 engages the blocking lever to bias the blocking lever into engagement with a lateral tab 172 of the lever 148 which underlies the blocking lever and limits movement of the blocking lever 164 relative to the lever 148 under the bias of the leaf spring 166.

A slotted lateral arm 174 of the bracket 126 abuts against the lateral ear 118 of the back plate 40. As schematically shown in FIG. 1, the other end of the cable 142 is pivoted at 176 to a lever 178 which is pivoted at 180 to the frame of a conventional door mounted inertia retractor 182 for either the lap or shoulder belt portion of a conventional passive seat belt arrangement. A leaf spring 184 is fixed to the pivot 180 for movement with the lever 178 as a unit whenever the cable 142 is shifted by the actuating lever 132. The leaf spring 184 is normally spaced from a pilot pawl 186 of the retractor 182 when the actuating lever 132 is in unactuated position and resiliently bears against the pilot pawl to inhibit pivotal movement of the pilot pawl about pivot 188 when the actuating lever is in actuated position. The pilot pawl 186 engages a gear wheel 190 when pivoted clockwise by the pendulum 192 of the retractor to in turn engage the main pawl 194 of the retractor with the reel teeth 196. It can be seen that the engagement of the leaf spring 184 with the pilot pawl 186 provides a counterclockwise bias on the pilot pawl which disables clockwise movement of the pilot pawl under the action of the pendulum. The retractor 182 forms no part of this invention and is in current production use on vehicles manufactured by the assignee of this invention.

When the bolt 18 is in latched position as shown in FIG. 5, the spring 154 biases the lever 148 to its unactuated position as shown therein. The engagement of the tab 172 of lever 148 locates the blocking lever 164 in its unblocking position against the bias of spring 166. In this position, the end of the blocking lever is located out of the path of the actuating lever 132. Should either the inside or outside handles be operated to rotate the operating lever 76, the actuating lever 132 will swing counterclockwise about the pivot 134 to shift the cable 142 upwardly and in turn engage the leaf spring 184 with the pilot pawl 186. This will temporarily disable the retractor 182.

Should the locking lever 44 be in an unlocked position when the operating lever 76 is rotated counterclockwise, the engagement of the leg 78 of the intermittent member 70 with the tab 80 of the detent 22 will disengage the detent shoulder 26 from the bolt shoulder 30 and will release the bolt 18 for movement from the latched position of FIG. 5 to the unlatched position of FIG. 4 to permit the door to be opened. The retractor 182 remains disabled as long as the inside or outside handle remains actuated by the driver or passenger of the vehicle.

As soon as the door has reached an open position wherein the bolt shoulder 28 has moved slightly past the detent shoulder 26, the leading edge 198 of the bolt picks up a cam edge 200 of the foot 160 of lever 148 to rotate this lever slightly clockwise from its FIG. 5 position to its FIG. 4 position. The cam edge 200 slides relative to the edge 198 of the bolt so that the end of the foot 160 engages the bolt as the bolt continues to move past the initial engagement position to the fully unlatched position.

When the lever 148 rotates slightly clockwise from its unactuated position shown in FIG. 5 to its actuated position shown in FIG. 4, the blocking lever 164 is moved with the lever 148 from its unblocking position of FIG. 5 to its blocking position of FIG. 4 wherein the end of the lever underlies the shoulder 138 of the actuating lever 132. Thus if the inside or outside handle is thereafter released, such as commonly occurs when the door is being opened either from the inside or outside, the actuating lever remains in its actuated position so that the retractor 182 continues to be disabled.

From the foregoing description it can be seen that movement of either the inside or outside handle temporarily disables the inertia retractor and with this temporary disablement is maintained when the handle is released as soon as the door has moved to an open position wherein the bolt shoulder 28 is slightly outboard of the detent shoulder 26.

When the door is in an open position and the bolt 18 is in its unlatched position, closing movement of the door will engage the bolt throat with the striker pin, not shown, to rotate the bolt from its unlatched position toward its latched position. As soon as the bolt reaches a position wherein the bolt shoulder 28 is slightly inboard of the detent shoulder 26, the end of the foot 160 of the lever 148 is disengaged from the face of the bolt. Spring 154 can then rotate lever 148 from its actuated position of FIG. 4 to its unactuated position of FIG. 5. This moves the blocking lever 164 from its blocking position of FIG. 4 to its unblocking position of FIG. 5. As this occurs, the blocking lever will no longer maintain the actuating lever 132 in its actuated position. Movement of the actuating lever to its FIG. 5 position is then obtained by the pilot pawl 186 engaging the spring 184 to shift the cable 142 downwardly.

Thus, this invention provides an improved control means for an occupant restraint belt system.

The embodiments of the invention in which an exclusive property or privilege is claimed are defined as follows:

1. In combination with a vehicle body closure mounting a restraint belt retractor having disabling means for disabling operation of the retractor, a door latch including a latch bolt releaseable for movement to latched and unlatched positions, inside operating means and outside operating means each operable to effect release of the latch bolt, control means comprising, operating means for actuating the disabling means, latch bolt position sensing means movable to actuating and non-actuating positions, means on the sensing means engageable by the latch bolt during movement of the latch bolt from latched position to unlatched position to move the sensing means to actuating position, connecting means movable to coupling and uncoupling positions with respect to the inside and the outside operating means, the connecting means operably coupling each of the inside and the outside operating means to the operating means in the coupling position thereof and operably uncoupling each of the inside and the outside operating means to the operating means in the uncoupling position thereof, and means actuated by the latch bolt position sensing means when the latch bolt position sensing means is in the actuating position thereof to maintain the connecting means in the uncoupling position and block movement thereof to coupled position.

2. In combination with a vehicle body closure mounting a restraint belt retractor having disabling means for disabling operation of the retractor, a door latch including a latch bolt releaseable movement between a latched position and an unlatched position, inside and outside operating means, each operable to effect release of the latch bolt, control means comprising, coupling means movable between coupling and uncoupling positions with respect to each of the inside and outside operating means and operable in coupled position to couple the inside and outside operators to the disabling means for actuating the disabling means upon actuation of each of the operating means, latch bolt position sensing means movable by the latch bolt from a non-actuating position to an actuating position upon movement of the latch bolt from latched position to unlatched position, blocking means movable between blocking and unblocking positions with respect to the coupling means, means biasing the blocking means to blocking position wherein the blocking means blocks movement of the coupling means from an uncoupled position to a coupled position with respect to the inside and outside operating means, and means on the latch bolt position sensing means blocking movement of the blocking means to blocking position when the latch bolt is in latched position.

3. The combination comprising, a vehicle body closure mounting a restraint belt retractor having disabling means for disabling operation of the retractor, a door latch including a latch bolt releasable for movement from a fully latched position through a partially latched position to an unlatched position, inside and outside operating means, each operable to effect release of the latch bolt, latch bolt position sensing means movable by the latch bolt from a non-actuating position to an actuating position upon movement of the latch bolt through the partially latched position, coupling means movable between coupling and uncoupling positions with respect to each of the inside and outside operating means and operable in coupling position to couple the inside and outside operators to the disabling means for actuating the disabling means upon actuation of each of the operating means, and means operable upon movement of the latch bolt position sensing means to actuated position to maintain the disabling means in actuated position.

4. In combination with a vehicle body closure mounting a restraint belt retractor having disabling means for disabling operation of the retractor, a door latch including a latch bolt releasable for movement between a latched position and an unlatched position, inside and outside operating means, each operable to effect release of the latch bolt, control means comprising, a disabling means operator movable from a first position to a second position by each of the inside and outside operating means and operable in the second position to actuate the disabling means, latch bolt position sensing means movable by the latch bolt from a non-actuating position to an actuating position upon movement of the latch bolt from latched position to unlatched position, blocking means movable between blocking and unblocking positions with respect to the operator, means biasing the blocking means to blocking position wherein the blocking means blocks movement of the operator from the second position to the first position, and means on the latch bolt position sensing means blocking movement of the blocking means to blocking position when the latch bolt is in latched position.

5. In combination with a vehicle body closure mounting a restraint belt retractor having disabling means for disabling operation of the retractor, a door latch including a latch bolt releasable for movement between a latched position and an unlatched position, inside and outside operating means, each operable to effect release of the latch bolt, control means comprising, a disabling means actuator movable between first and second positions and operable in the second position to actuate the disabling means, means normally locating the actuator in the first position, means moving the actuator to the second position upon actuation of each of the inside and outside operating means, a movable latch bolt sensor located in a nonactuation position in the path of movement of the latch bolt and movable by the latch bolt from the non-actuating position to an actuating position upon movement of the latch bolt from latched position to unlatched position, and blocking means movable with the sensor between an unblocking position when the sensor is in the non-actuating position to a blocking position when the sensor is in actuating position wherein the blocking means blocks movement of the actuator from the second position to the first position.

* * * * *